US005528260A

United States Patent [19]
Kent

[11] Patent Number: 5,528,260
[45] Date of Patent: Jun. 18, 1996

[54] METHOD AND APPARATUS FOR PROPORTIONAL AUTO-SCROLLING

[75] Inventor: William J. Kent, Mill Valley, Calif.

[73] Assignee: Autodesk, Inc., San Rafael, Calif.

[21] Appl. No.: 362,810

[22] Filed: Dec. 22, 1994

[51] Int. Cl.$^6$ ..................................... G09G 5/34
[52] U.S. Cl. ........................... 345/123; 345/145
[58] Field of Search .................. 345/123–125, 345/145; 395/138, 157

[56] References Cited

U.S. PATENT DOCUMENTS 5,289,168  2/1994  Freeman .................................. 345/123

FOREIGN PATENT DOCUMENTS

| 1-179193 | 7/1989 | Japan | 345/123 |
| 2-188790 | 7/1990 | Japan | 345/123 |
| 2-277097 | 11/1990 | Japan | 345/123 |
| 5-27941 | 2/1993 | Japan . | |

OTHER PUBLICATIONS

*Codewright*™ *for Windows (Programmer's Reference Manual)*, Premia Corporation, Nov. 1991, (photocopy of cover page and front/back of the publication's title page).
*Codewright*™ *for Windows (User's Manual)*, Premia Corporation, Oct. 1991 (photocopy of cover page and front/back of the publication's title page).

Primary Examiner—Jeffery Brier
Attorney, Agent, or Firm—Merchant, Gould, Smith, Edell, Welter & Schmidt

[57] ABSTRACT

A method and apparatus for proportional auto-scrolling through data displayed in a window on a monitor attached to a computer. The speed and direction of the proportional auto-scrolling function is determined by the cursor orientation to the window where the data is displayed.

12 Claims, 5 Drawing Sheets

METHOD AND APPARATUS FOR PROPORTIONAL AUTO-SCROLLING

BACKGROUND OF THE INVENTION

1. Field of the Invention

The present invention relates generally to computer implemented systems for displaying information stored in a file in a computer to a user, and in particular, to a method and apparatus for proportional auto-scrolling through data displayed in a window wherein the scrolling speed and direction is determined by the cursor position on the display.

2. Description of the Related Art

Presenting information to a user with a computer using multiple windows on a display device with a graphical user interface is well known in the art. Also well known in the art is the technique of using a pointing device, such as a mouse or a trackball to select data within the file before a function is applied to the data. Further, the method of using the pointing device to provide graphical input to the window is also well known.

However, these techniques present some unique problems. Typically, the information contained in the file is greater than what can be displayed in the window at one time. Similarly, the user may want to provide graphical input which exceeds the window size. Hence, some method must be employed to allow the user to use the pointing device to select or input information which exceeds the window boundaries.

One possible method to solve this problem is to merely enlarge the window. However, this is useful only when the amount of data is less than the window size.

Another method to solve this problem is to use auto-scroll functions, which are well known in the art. Using auto-scroll methods, the data displayed in the window is automatically scrolled without using the scroll bars when the pointing device is "dragged" outside the window.

These prior art auto-scroll methods, however, are inherently limited and do not fully utilize the capabilities of the graphical user interface. For example, the prior art auto-scrolling methods do not allow the user to control the speed of the auto-scroll. The net result is that the speed of the auto-scroll is often too fast or too slow. The speed of the auto-scroll may be too slow in situations where the user desires to scroll only a small part of the file that is not displayed in the window. Conversely, the speed of the auto-scroll may be too fast in situations where the user desires to select a large amount of text. Analogous problems exist when the user desires to input graphical user inputs larger than the window size. This situation may occur when using paint, draw, or CAD (computer automated design) programs.

Therefore, there exists a need for an intuitive proportional auto-scroll capability for information presented in a window.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be utilized and structural changes may be made without departing from the scope of the present invention.

Figure 1:
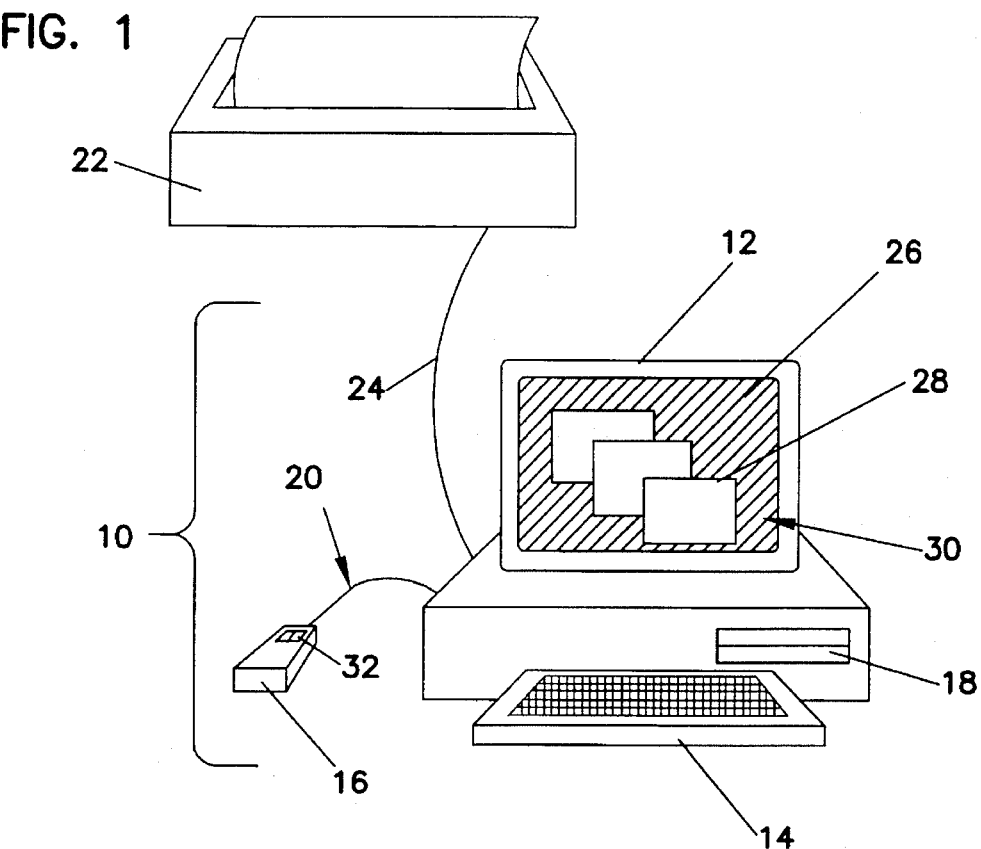
FIG. 1 illustrates one possible embodiment of the present invention.

FIG. 1 shows one possible embodiment of the present invention. The present invention comprises a method and apparatus for proportional auto-scrolling through data displayed on a computer 10. The computer 10 preferably includes a display device 12, keyboard 14, mouse pointing device 16 and disk storage 18. The mouse pointing device 16 is connected to the computer 10 by a connecting cable 20. Also a printer 22 may be attached to the computer 10 by a cable 24. Those skilled in the art will recognize that other pointing and selecting devices may be used in place of one mouse pointing device 16. For example, a trackball or pressure sensor device may be used. Also, pointing and selecting of data on the display device 12 may be accomplished by devices which use physical contact with the display device 12. Those skilled in the art will also recognize that the display device 12 can be any device capable of presenting information to the user, including cathode ray tube monitors and liquid crystal displays. Of course, the elements described in FIG. 1 may also be integrated into a single package, such as a laptop or notebook computer.

In the preferred embodiment, an application program (not shown) executing under the control of an operating system 26 displays one or more windows 28 on the display device 12 to the user. The proportional auto-scroll function 30 of the present invention is implemented by the computer 10 and is typically embodied either within the application program or the operating system 26 as a function associated with the display of data in the windows 28.

The proportional auto-scroll function 30 of the present invention is used when only a portion of the available data is displayed in the window 28. In response to an operator command, the data displayed in the window 28 is automatically scrolled in an operator-selected direction and at an operator-selected speed.

In the preferred embodiment, the proportional auto-scroll function 30 is enabled by an operator based on a cursor's position relative to the window 28. In particular, the proportional auto-scroll function 30 is enabled when the cursor is either placed or dragged outside the active window 28.

Of course, those skilled in the art will note that the proportional auto-scroll function 30 may be enabled in several other ways. In one alternative embodiment, the auto-scroll function 30 could be enabled by dragging the cursor position from within the window 28 to outside the window 28. In another alternative embodiment, the auto-scroll function could be enabled by merely placing the cursor position outside the window 28.

In a preferred embodiment, the direction and speed indication for the proportional auto-scroll function 30 comprises a cursor position on the display device 12. Preferably, the direction of the auto-scroll function 30 is determined by the cursor's orientation to the window 28, and the speed of the auto-scroll function 30 is related to the cursor's distance from the window 28.

Of course, those skilled in the art will recognize that the speed and direction of the auto-scroll function 30 may be selected in other ways. For example, in one alternative embodiment, the speed of the auto-scroll function 30 may be determined by the period of time that the cursor is located outside the window 28. In another alternative embodiment, the speed of the auto-scroll function 30 may be selected by depressing buttons on the pointing device 4 or keyboard 14, singly, in different combinations, or multiple times.

The auto-scroll function 30 of the present invention provides several advantages over prior art auto-scroll methods. First, it allows the user to select the scroll speed. The present invention also allows large files to be scrolled more quickly, while at the same time allowing smaller files to be scrolled more slowly without requiring the user to master the use of any additional buttons or functions. In addition, the scroll speed is selected in an intuitively satisfying way, which is consistent with a graphical user interface (GUI) concept. Further, the auto-scroll function 30 is implemented without requiring any changes in the user interface. With the present invention, the user can easily select both the speed and direction of auto-scroll merely by the position of a cursor relative to the window 28 displayed on the display device 12.

Figure 2:
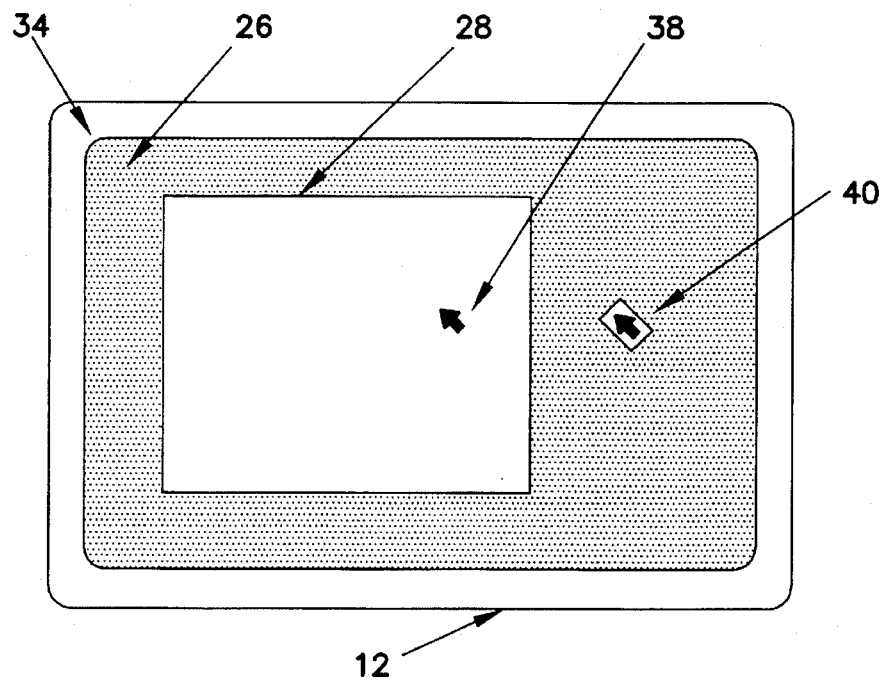
FIG. 2 is a diagram showing the relationships between the cursor and the window in one possible embodiment of the invention.

FIG. 2 is a diagram showing a display screen 34 presented to the user of the computer 10 on the display device 12. The operating system 26 displays data in a window 28 on the display screen 34. By manipulating the pointing device 16, the location of a cursor 38 can be varied to locations throughout the display screen 34. As described above, the proportional auto-scroll function 30 may be enabled by locating the cursor 38 inside the window 28, depressing one or more buttons 32 on the pointing device 16, and moving the cursor 38 to a location outside the window 28, e.g., the position indicated by 40.

Figure 3:
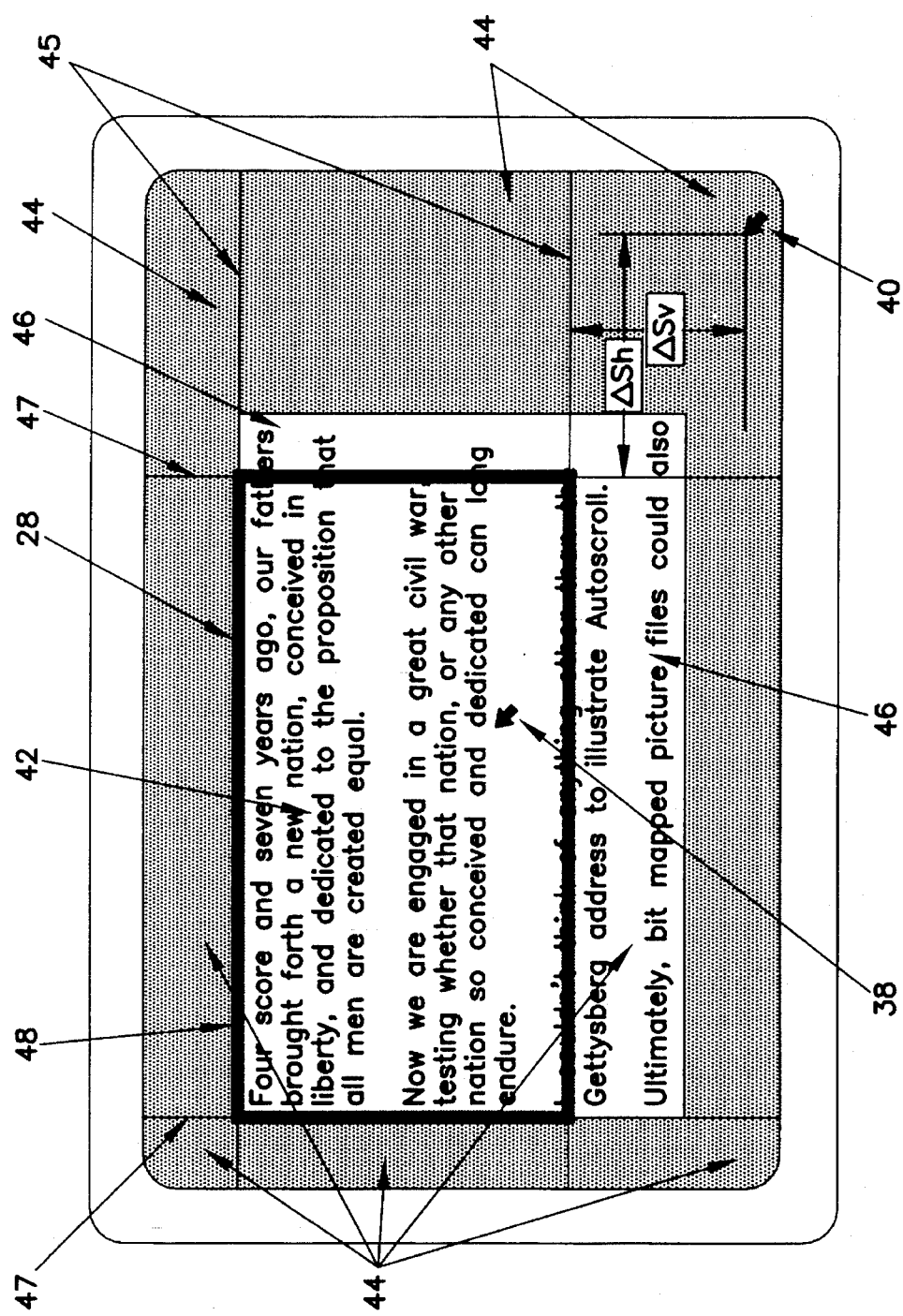
FIG. 3 is a diagram showing how the auto-scroll speed and direction may be determined for one possible embodiment of the invention.

FIG. 3 is a diagram showing information presented to the user of the computer 10 on the display device 12. This diagram illustrates one possible implementation for determining the speed and direction of the auto-scroll function 30 from the cursor position. In this example, data 42 is displayed within the window 28, wherein the window boundary 48 is indicated with a heavy line. Generally, the amount of the data would be larger than the size of the window 28 when the auto-scroll function is used. Hence, data 42 that is contained within the window 28 yet invisible to the user is shown as hidden text 46. Also shown in FIG. 3 is a cursor position 38 located inside the window 28 and a cursor position 40 located outside the window.

In the preferred embodiment, the speed of the proportional auto-scroll function 30 is calculated by determining the distance of the cursor from horizontal 45 and vertical 47 lines formed by extending the borders of the window to the display screen 34 periphery. When the cursor is dragged to the position 40 outside the window 28, the vertical and horizontal distance, $\Delta s_v$ and $\Delta s_n$, from the horizontal 45 and vertical 47 lines indicate the desired speed of auto-scroll function 30 in each direction. Of course, those skilled in the art will note that the speed of the auto-scroll function may also be determined in other ways, e.g., the speed may depend on the radial distance of the cursor 44 from the center of the window 28.

In the preferred embodiment, the direction of the proportional auto-scroll function 30 is determined by dividing the area surrounding the window 28 into eight auto-scroll cursor regions 44. Each auto-scroll cursor region 44 is adjacent to the window 28 and either directly horizontally opposed to the window 28, directly vertically opposed to the window 28 or both horizontally and vertically opposed to the window 28. These regions 44 are used to define the direction of the auto-scroll function 30. For example, if one of the buttons 32 on the pointing device 16 is depressed with the cursor 38 positioned within the window 28, and thereafter the pointing device 16 is dragged with the button 32 held down to a cursor position 40 outside the window 28, then the direction of the proportional auto-scroll function 30 defined by this motion would be determined from the region in which the cursor 40 is located. In the example shown in FIG. 3, the direction of the auto-scroll function 30 would be down and to the right. Of course, those skilled in the art will note that the auto-scroll cursor regions 44 may also be defined in other ways, e.g., the regions 44 may be defined as extending radially away from the center of the window 28 toward the edges of the display screen 34.

Those skilled in the art will note that both the speed and direction of the proportional auto-scroll function 30 may also be determined by separating the region outside the window 28 into greater numbers of regions 44 and determining both the speed and direction of the auto-scroll function 30 from the region in which the cursor 40 located outside of the window 28 is positioned. In another alternative embodiment, those skilled in the art will note that both the speed and direction of auto-scroll function 30 may be determined directly from a vector from the boundaries of the window 28 to the cursor position 40 outside the window 28, or from a vector from the center of one window 28 to the cursor position 40. This embodiment would have the additional advantage of defining the speed of the auto-scroll function proportional to the window size.

The auto-scroll function 30 may also allow the user to input graphical data exceeding the window boundary 48. In this embodiment, the auto-scroll function 30 presents graphical user inputs on the display device 12. Typically, the graphical user inputs are described by positioning the cursor 38 within the window 28, depressing and holding down the mouse button 32 while the cursor 38 is dragged to other locations within the window 28. When the graphical user input does not exceed the window boundary 48, the auto-scroll function 30 is not enabled. When the cursor 38 is dragged to locations 40 outside the window 28, the graphical user input exceeds the window boundary 48, and the auto-scroll function 30 is enabled. Those skilled in the art will recognize that in this embodiment, the speed and direction of the auto-scroll function 30 may be controlled as described herein. Also, those skilled in the art will recognize that graphical user inputs may be used to enable the auto-scroll function in other ways. For example, the graphical user input can be defined by the selection of defined objects whose size and location require the auto-scroll function 30 to be enabled to present the object in the window 28.

Figure 4:
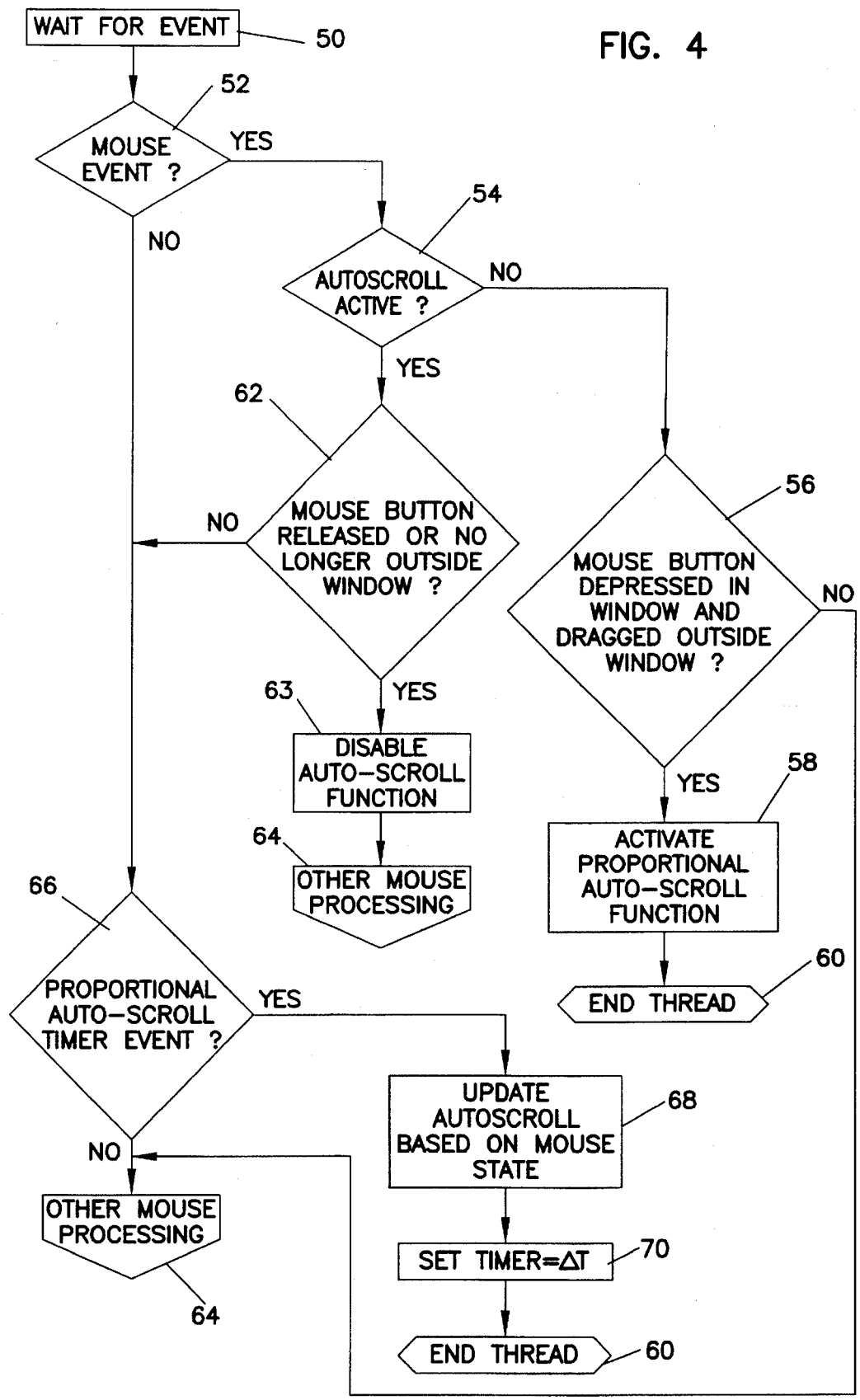
FIG. 4 is a flow chart illustrating the logic of the present invention.

FIG. 4 is a flow chart illustrating one embodiment of the logic for implementing the proportional auto-scroll function 30 of the present invention. Block 50 waits for an event to occur, indicating mouse input from the user. Block 52 checks to determine if the mouse event indicates that the auto-scroll function 30 should be enabled. For example, in the preferred embodiment, block 52 will be set to a logical true when a button 32 in the pointing device 16 is depressed when the cursor 38 is located within the window 28, and thereafter dragged to a position 40 outside the window 28. In an alternative embodiment, block 52 will be enabled when the cursor 38 is moved to a position 40 outside of the window.

If block 52 indicates that a mouse event has occurred, block 54 determines whether the auto-scroll function 30 is activated. If block 52 indicates that mouse event has not occurred, block 66 checks to determine if a timer event has occurred.

Block 54 determines whether the auto-scroll function 30 is activated. If block 54 indicates that the auto-scroll function 30 is not activated, block 56 checks to determine if a mouse button 32 was depressed within the window 28 and dragged outside of the window 28. If the result of block 56 is a logical false, the logic reverts to block 64, returning to other mouse processing. If the result of block 56 is a logical true, block 58 activates the proportional auto-scroll function as described in FIG. 5, and ordinary processing is resumed in block 60.

If block 54 indicates that the auto-scroll function 30 is activated, block 62 checks to determine if a mouse button 32 was released or is no longer outside the window 28. If the result of block 62 is true, block 63 disables the auto-scroll function 30 as described in FIG. 6, and thereafter, the logic reverts to block 64, returning to other mouse processing. If the result of block 62 is a logical false, block 66 checks to determine if a timer event has occurred.

Figure 7A:
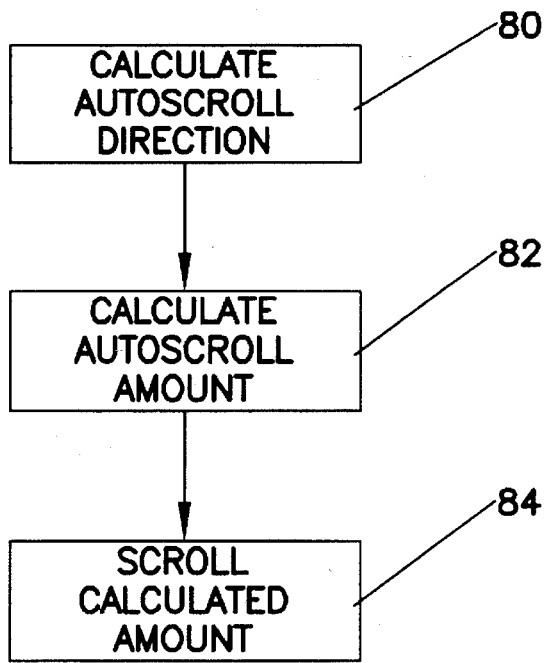
FIG. 7A is a flow chart illustrating the auto-scroll update logic.

If a timer event has occurred as determined by block 66, auto-scroll is updated based upon the mouse state 68 as described in FIG. 7A. Thereafter the timer is reset to a value of $\Delta T$ as shown in block 70. If a timer event has not occurred as determined by block 68, other mouse processing 64 is selected.

Other embodiments of the auto-scroll speed and direction logic are possible. For example, the speed of the auto-scroll function 30 may be set by varying the timer value, $\Delta T$, instead of $\Delta s_v$ and $\Delta s_h$. Also, the auto-scroll function 30 may be implemented using simple polling techniques instead of event loops.

Figure 5:
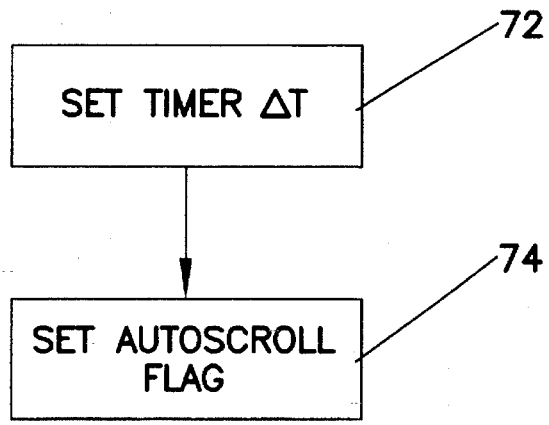
FIG. 5 is a flow chart illustrating the proportional auto-scroll activation logic.

FIG. 5 is a flow chart illustrating the proportional auto-scroll activation logic. Block 72 sets the auto-scroll timer to a value of $\Delta T$, and block 74 sets the auto-scroll flag.

Figure 6:
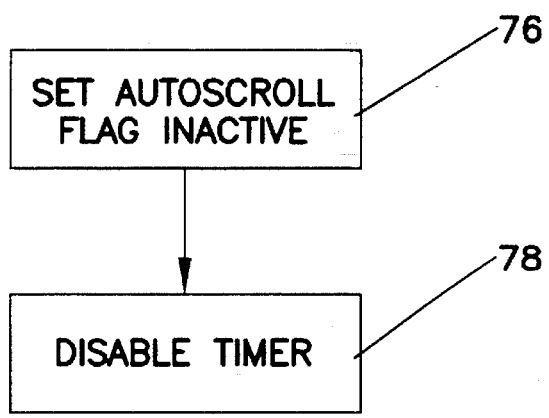
FIG. 6 is a flow chart illustrating the proportional auto-scroll disable logic.

FIG. 6 is a flow chart illustrating the proportional auto-scroll disable logic. Block 76 sets an auto-scroll flag to inactive status. Block 78 disables the auto-scroll timer.

FIG. 7A is a flow chart illustrating the auto-scroll update logic. Block 80 calculates the auto-scroll function 30 direction. Block 82 calculates the auto-scroll amount as described in FIG. 7C. Block 84 scrolls the calculated amount.

Figure 7B:
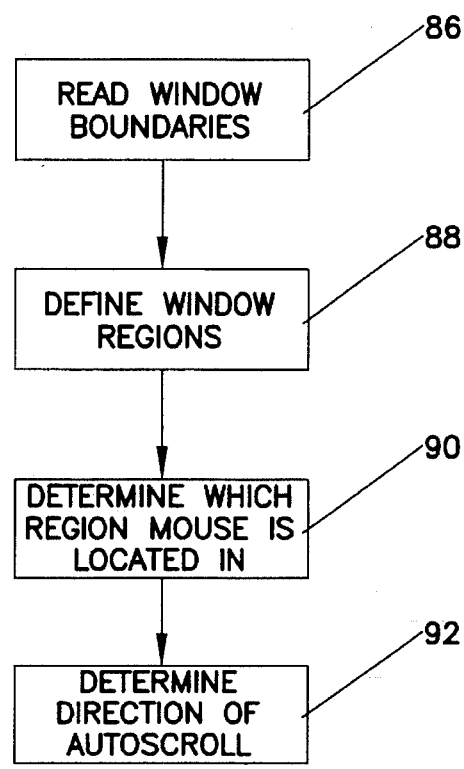
FIG. 7B is a flow chart illustrating the auto-scroll direction logic.

FIG. 7B is a flow chart illustrating the auto-scroll direction logic. Block 86 reads the window boundaries. Block 88 defines window regions 88. Block 90 determines which region the cursor is located in, and block 92 determines the direction of the auto-scroll function 30. The window region defined in block 88 ordinarily correspond to the auto-scroll cursor regions 44. Further, the direction of auto-scroll 92 is determined from which region the mouse is located in as calculated in block 90. For example, if the cursor 38 is located outside the window 28 as shown in FIG. 3, then the direction of the auto-scroll function 30 is determined to be down and to the right.

Figure 7C:
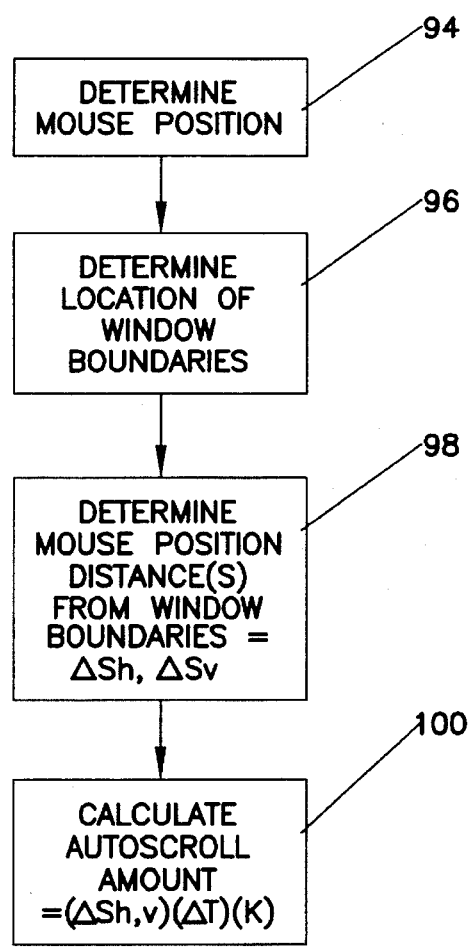
FIG. 7C is a flow chart illustrating the auto-scroll speed logic.

FIG. 7C is a flow chart illustrating the logic employed in calculating the auto-scroll amount or speed. Block 80 determines the position of the cursor 38. The position of the cursor 38 is determined in block 94. Block 96, determines the location of the window 28 boundaries. This step is ordinarily analogous to that performed in block 86. Block 98 determines the distance from the mouse position to each window boundary. Block 100 uses these distances, denoted $\Delta s_h$ for the horizontal distance and $\Delta s_v$ for the vertical distance, to calculate the auto-scroll amount. In one embodiment, auto-scroll amount in the horizontal direction is calculated as a product of the distance from the window boundary in the horizontal direction, $\Delta s_h$, the value of the timer $\Delta T$ and a constant K selected either by the user or by the program to control the auto-scroll scaled speed. For example, if either the user or the application program containing the auto-scroll function 30 desires greater sensitivity, the value of K would be proportionally increased so that the auto-scroll amount would be larger for given values of $\Delta s_h$ or $\Delta s_v$ and $\Delta T$. The auto-scroll speed in the vertical direction is calculated the same way, but using the distance from the window boundary in the vertical direction, $\Delta s_v$.

In an alternative embodiment, the speed of the auto-scroll function 30 is determined by the vector distance from the center of the window 28 to the cursor position outside of the window 40. Further, in another alternative embodiment, block 88 defines auto-scroll cursor regions 44 radially from the window 28, and these regions are used to define the direction of auto-scroll in block 92. Finally, in yet another alternative embodiment, block 88 defines a number of auto-scroll cursor regions 44 sufficient to define both the speed and direction of the auto-scroll function 30, and the speed and direction of auto-scroll are determined from the location of the cursor 38. For example, if twenty-four auto-scroll cursor regions 44 are defined, both the speed and direction of the proportional auto-scroll function 30 are be determined from the location of the cursor 38.

This concludes the description of the preferred embodiment of the invention. In summary, the present invention discloses a system by which information contained in the files stored in the computer are automatically and proportionately scrolled in a direction and speed selected by the user. This is accomplished by displaying at least a portion of the file's contents in a window on a monitor attached to the computer, accepting operator input to enable proportional auto-scroll function, and performing the proportional auto-scroll function according to the operator input. Systems and methods have been described by which the operator input comprises a direction and speed indication, and the direction and speed of the auto-scroll is accordingly selected. Further, the present invention discloses a system and method wherein a cursor positioned on the monitor determines the direction and speed of the auto-scroll, and in one embodiment, the cursor's distance from the window is used to determine the speed of auto-scroll.

The foregoing description of the preferred embodiment of the invention has been presented for purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of proportionally auto-scrolling through information on a display attached to a computer, comprising the steps of:
   (a) presenting at least a portion of the information in a window on the display, the window defined by borders dividing the display into a window region and a surrounding display region;
   (b) logically subdividing the surrounding display region into a plurality of auto-scroll cursor regions defined by horizontal and vertical lines formed by extending the borders from the window to an outer periphery of the display;
   (c) accepting operator input into the computer to enable a proportional auto-scrolling function, the operator input comprising a selected cursor position in one of the auto-scroll cursor regions;
   (d) computing a proportional auto-scroll direction and said in the computer using the operator input, the auto-scroll direction being determined from the auto-scroll cursor region in which the selected cursor position is located, and the auto-scroll speed being determined by a distance from the selected cursor position to the nearest one of the vertical lines and a distance from the selected cursor position to a nearest one of the horizontal lines; and
   (e) performing the proportional auto-scrolling function according to the computed auto-scroll direction and speed, wherein the proportional auto-scrolling function comprises successively presenting portions of the information on the display according to the computed auto-scroll direction and speed.

2. The method of claim 1, wherein the auto-scroll speed is computed in rectangular coordinates.

3. The method of claim 1, wherein the auto-scroll direction is computed in rectangular coordinates.

4. The method of claim 1, wherein the operator input comprises the steps of locating the cursor inside the window, depressing at least one button on a pointing device controlling the cursor, and moving the cursor from the window region to an auto-scroll cursor region.

5. A program storage device readable by a computer and tangibly embodying a program of instructions executable by the computer to perform method steps for proportionally auto-scrolling information on a display attached to a computer, the method steps comprising the steps of:
   (a) presenting at least a portion of the information in a window on the display, the window defined by borders dividing the display into a window region and a surrounding display region;
   (b) logically subdividing the surrounding display region into a plurality of auto-scroll cursor regions defined by horizontal and vertical lines formed by extending the borders from the window to an outer periphery of the display;
   (c) accepting operator input into the computer to enable a proportional auto-scrolling function, the operator input comprising a selected cursor position in one of the auto-scroll cursor regions;
   (d) computing a proportional auto-scroll direction and speed in the computer using the operator input, the auto-scroll direction being determined from the auto-scroll cursor region in which the selected cursor position is located, and the auto-scroll speed being determined by a distance from the selected cursor position to the nearest one of the vertical lines and a distance from the selected cursor position to a nearest one of the horizontal lines; and
   (e) performing the proportional auto-scrolling function according to the computed auto-scroll direction and speed, wherein the proportional auto-scrolling function comprises successively presenting portions of the information on the display according to the computed auto-scroll direction and speed.

6. The method of claim 5, wherein the auto-scroll speed is computed in rectangular coordinates.

7. The method of claim 5, wherein the auto-scroll direction is computed in rectangular coordinates.

8. The method of claim 1, wherein the operator input comprises the steps of locating the cursor inside the window, depressing at least one button on a pointing device controlling the cursor, and moving the cursor from the window region to an auto-scroll cursor region.

9. A device for proportionally auto-scrolling through information on a display attached to a computer, comprising:
   (a) means, performed by the computer, for presenting at least a portion of the information in a window on the display, the window defined by borders dividing the display into a window region and a surrounding display region;
   (b) means, performed by the computer, for logically subdividing the surrounding display region into a plurality of auto-scroll cursor regions defined by horizontal and vertical lines formed by extending the borders from the window to an outer periphery of the display;
   (c) means, performed by the computer, for accepting operator input into the computer to enable a proportional auto-scrolling function, the operator input comprising a selected cursor position in one of the auto-scroll cursor regions;
   (d) means, performed by the computer, for computing a proportional auto-scroll direction and speed from the operator input, the auto-scroll direction being determined from the auto-scroll cursor region in which the selected cursor position is located, and the auto-scroll speed being determined by a distance from the selected cursor position to the nearest one of the vertical lines and a distance from the selected cursor position to a nearest one of the horizontal lines; and
   (e) means, performed by the computer, for performing the proportional auto-scrolling function according to the computed auto-scroll direction and speed, wherein the proportional auto-scrolling function comprises successively presenting portions of the information on the display according to the computed auto-scroll direction and speed.

10. The device of claim 9, wherein the auto-scroll speed is computed in rectangular coordinates.

11. The device of claim 9, wherein the auto-scroll direction is computed in rectangular coordinates.

12. The device of claim 9, wherein the operator input comprises locating the cursor inside the window, depressing at least one button on a pointing device controlling the cursor, and moving the cursor position from the window region to an auto-scroll cursor region.

* * * * *

UNITED STATES PATENT AND TRADEMARK OFFICE
CERTIFICATE OF CORRECTION

PATENT NO. :  5,528,260

DATED      :  June 18, 1996

INVENTOR(S) :  William J. Kent

It is certified that error appears in the above-identified patent and that said Letters Patent is hereby corrected as shown below:

Column 7, line 19, before "in", "said" should read --speed--.

Signed and Sealed this

Nineteenth Day of November, 1996

Attest:

BRUCE LEHMAN

Attesting Officer

Commissioner of Patents and Trademarks